United States Patent [19]

Morrison et al.

[11] Patent Number: 5,063,685
[45] Date of Patent: Nov. 12, 1991

[54] TAPE SCALE APPLICATOR

[75] Inventors: Robert B. Morrison, Badminton; Brian C. R. Henning, Thornbury; Stephen E. Lummes, Stroud; David R. McMurtry, Wotton-Under-Edge, all of United Kingdom

[73] Assignee: Renishaw plc, Wotton-Under-Edge, United Kingdom

[21] Appl. No.: 474,075

[22] PCT Filed: Sep. 1, 1989

[86] PCT No.: PCT/GB89/01021

§ 371 Date: Apr. 30, 1990

§ 102(e) Date: Apr. 30, 1990

[87] PCT Pub. No.: WO90/02919

PCT Pub. Date: Mar. 22, 1990

[30] Foreign Application Priority Data

Sep. 2, 1988 [GB] United Kingdom ............... 8820777

[51] Int. Cl.$^5$ ............. G01B 3/10; G01B 21/00; B32B 31/00
[52] U.S. Cl. .......................... 33/701; 33/758; 33/503; 156/574; 156/361
[58] Field of Search ............. 33/701, 758, 706, 503, 33/710, 759, 707, 708, 700; 156/574, 523, 361, 526

[56] References Cited

U.S. PATENT DOCUMENTS

| 2,742,705 | 4/1956 | Gelardi | 33/758 |
| 3,775,219 | 11/1973 | Karlson et al. | 156/526 |
| 3,810,805 | 5/1974 | Goldsworthy et al. | 156/361 |
| 4,333,238 | 6/1982 | McMurtry | 33/503 |
| 4,702,013 | 10/1987 | McMurtry | 33/503 |
| 4,777,818 | 10/1988 | McMurtry | 33/503 |
| 4,781,782 | 11/1988 | Luhman et al. | 156/574 |
| 4,782,598 | 11/1988 | Guarini | 33/503 |
| 4,877,193 | 10/1989 | Vaniglia | 156/574 |
| 4,884,889 | 12/1989 | Beckwith, Jr. | 33/503 |
| 4,936,023 | 6/1990 | Pechak | 33/706 |

Primary Examiner—William A. Cuchlinski, Jr.
Assistant Examiner—C. W. Fulton
Attorney, Agent, or Firm—Spencer & Frank

[57] ABSTRACT

A tape scale applicator (100) has a guiding channel (142) for aligning a metrological scale (126) relative to a substrate (150) to which the scale is applied. The applicator (100) is attached to a mounting bracket (153) for a read head (used to read the scale) provided on a member (154), which moves relative to the substrate (150). The applicator (100) is used to apply the scale (126) to the substrate in order to ensure that the scale (126) has a precise alignment with the read head, once the read head is connected to the mounting bracket (153). The tape scale (126) has a backing strip (140) which is removed via a second channel (170) as the scale (126) passes through the guiding channel (142).

18 Claims, 4 Drawing Sheets

TAPE SCALE APPLICATOR

BACKGROUND OF THE INVENTION

The invention relates to a method and a device for applying a tape to a substrate which is provided on a coordinate positioning machine (e.g. a coordinate measuring machine or machine tool). It may be used to apply a metrological scale which is in the form of a tape to such a machine. Typically, the coordinate positioning machine will have at least two parts movable relative to each other along an axis; the scale is affixed to one of the parts, and used in conjunction with a read head (attached to the other of the parts) to measure the relative movement of the two parts. The read head projects light onto the scale, and, from the light passed on by the scale determines the magnitude of relative movement of the two members along the axis.

SUMMARY OF THE INVENTION

In order to obtain high accuracy measurements of the relative movement of the two parts, it is desirable to apply the tape to one of the parts so that it retains a precise pre-determined alignment with the read head along the entire extent of movement of the read head. Any misalignment of the tape relative to the path of the read head will inevitably result in reduced accuracy measurement readings. The present invention attempts to overcome the difficulty of misalignment of the tape by providing a method and apparatus of applying a tape to a substrate according to the appended claims.

BRIEF DESCRIPTION OF THE DRAWINGS

Examples of the invention will be described with reference to the accompanying drawings wherein.

DETAILED DESCRIPTION OF THE PREFERRED EMBODIMENTS

Figure 2:
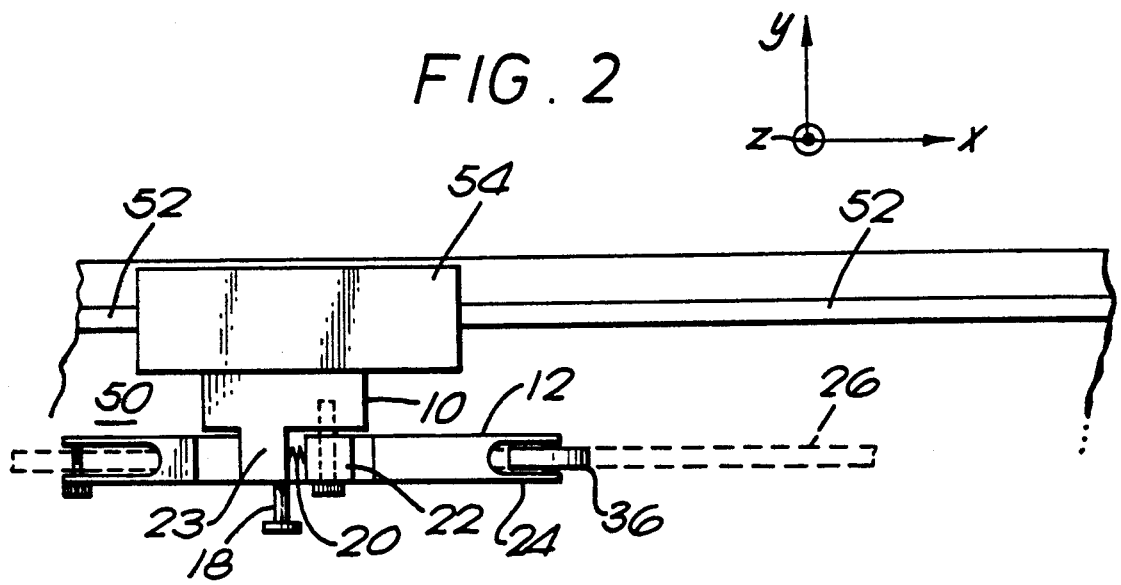
FIG. 2 is a plan view showing the device in FIG. 1 mounted on a co-ordinate measuring machine or machine tool.

Referring firstly to FIG. 2 there is shown a portion of a co-ordinate measuring machine or machine tool, comprising a relatively fixed part 50 having a guideway 52 along which a movable part 54 is slideable. (The guideway thus defines the axis of relative movement of the two members). For example, the movable parts 54 may be a carriage or gantry of the machine, while the relatively fixed part 50 may be the bed of the machine or another carriage or gantry. It is common in such machines to provide a periodically marked metrological scale 26 on the fixed part 50 (which thus provides a substrate for supporting the scale), and a readhead on the movable part 54, so as to measure the relative position of the two parts. The inverse arrangement, with the scale on a movable part (which would then provide the substrate) and the readhead on a relatively fixed part, is also quite common, and the present invention is equally applicable to such an arrangement.

The plane in which the substrate lies (and thus in which the scale is supported) may be defined as the x-y plane; the x-axis extends in the direction of the length of the scale (which is ideally parallel to the guideway 52), and the y-axis in the direction of extension of the lines on the scale. A z-axis is defined as extending parallel to the surface normal of the x-y plane. This notation will be adhered to in all examples shown in the present application.

Our International Patent Specifications Nos. WO 88/00331 and WO 88/00332 show examples of such scales and readheads, in which the scale is in the form of a flexible tape. Such a tape may have a self-adhesive backing, provided by a layer of pressure-sensitive adhesive, to enable it to be affixed to the machine. The self-adhesive layer can be protected by a backing strip, which the user has to peel off. He then has to affix the tape to the fixed part 50 of the machine in such a manner as to be exactly parallel to the guideway 52. For short lengths of tape scale, it is feasible to align the scale with the guideway by placing it along a straightedge which is temporarily fixed to the machine. However, for longer lengths of scale this is more difficult, and so the applicator described below is used instead.

Figure 1:
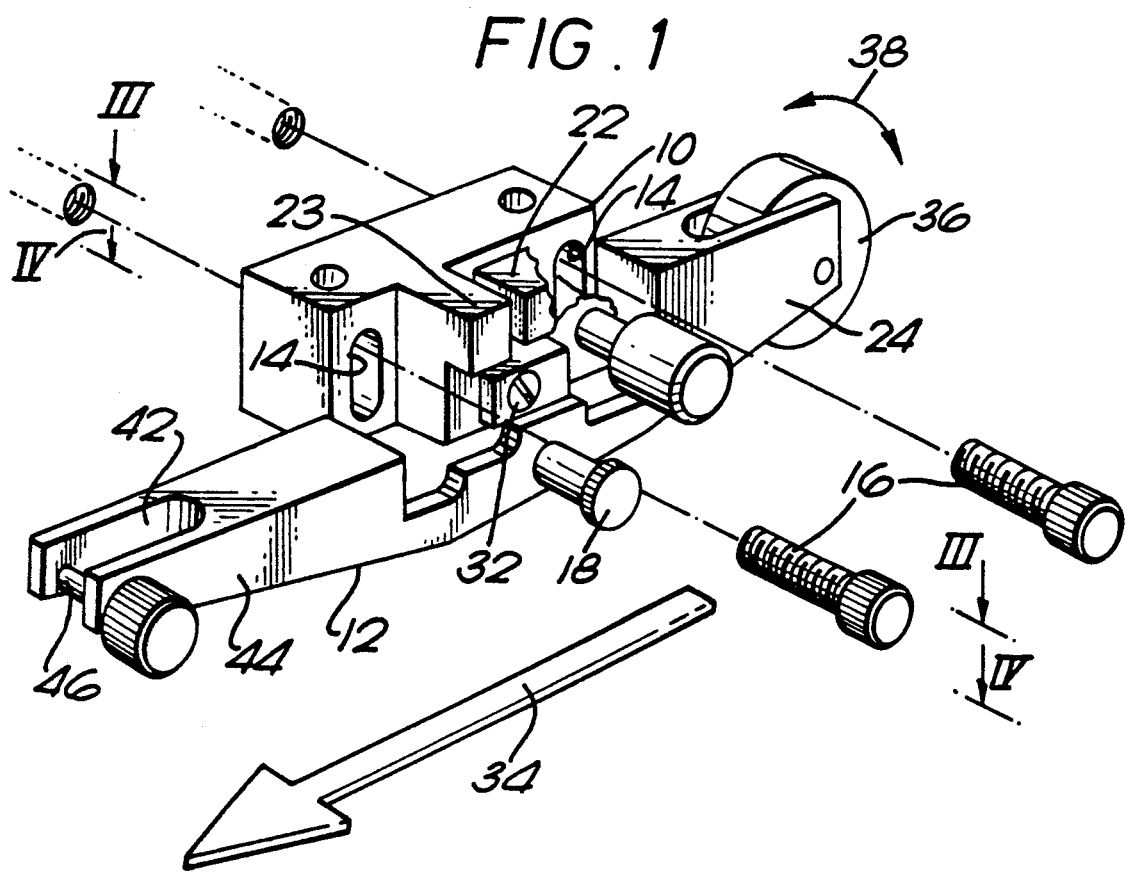
FIG. 1 is an isometric view of a first embodiment of a device according to the present invention.

As seen in FIGS. 1 and 2, the applicator has a mounting body 10 and a trailing carriage 12. When it is desired to affix a tape scale 26 to the machine, the mounting body 10 of the applicator is secured to the movable part 54 of the machine by mounting screws 16 through slots 14, in place of the readhead which is ususally positioned on the movable part 54. The mounting body 10 has a thickness which is designed to ensure the tape 26 is laid at the correct distance from the guideway 52 to suit the dimensions of the readhead to be employed.

Figure 3:
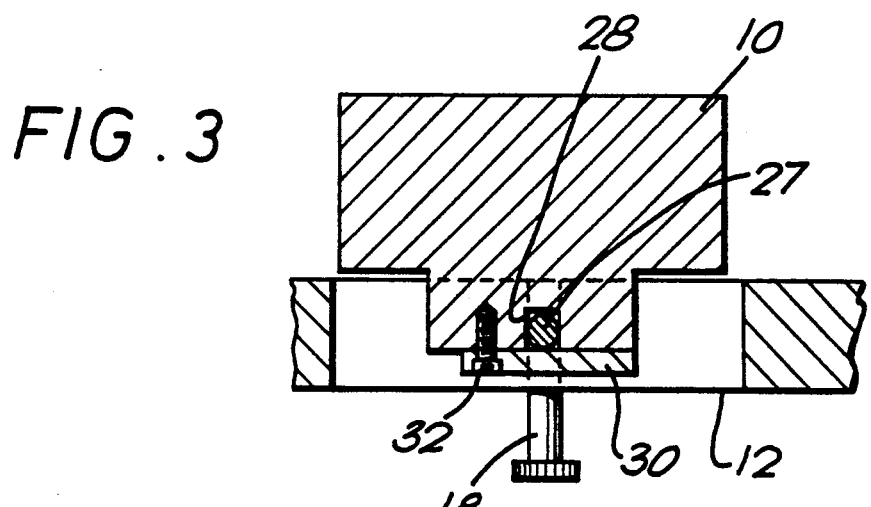
FIG. 3 is a horizontal section on the line III—III in FIG. 1.
Figure 4:
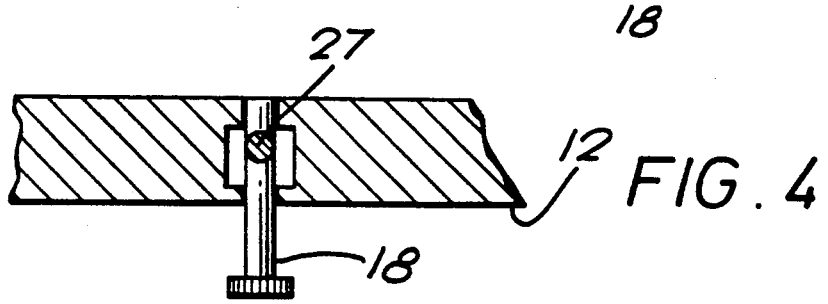
FIG. 4 is a horizontal section on the line IV—IV in FIG. 1.

The carriage 12 of the applicator is mounted to the mounting body 10 by a two-way pivotal joint, pivotable to a limited extent about both a horizontal axis and a vertical axis. As seen in FIGS. 3 and 4, the horizontal pivoting axis is provided by a pin 18, upon which the carriage 12 is journalled. The pin 18 projects laterally from the carriage 12 for a reason which will be described later. A compression spring 20 (FIG. 2) acts between an upper part 22 of the carriage 12 and a corresponding lug 23 of the mounting body 10, so as to bias an end 24 of the carriage 12 downwards, pivoting about the pin 18.

The vertical pivoting axis of the pivotal joint between the carriage 12 and the mounting body 10 is provided by a vertical pin 27 which is secured in an upstanding position on the pin 18. The pin 27 is received in a channel 28 in the mounting body 10, as shown in FIG. 3. A locking plate 30 traps the pin 27 in the channel 28, and has a locking screw 32 which, if tightened, causes the locking plate 30 to grip the pin 27 in the channel 28 so as to prevent relative rotation about the vertical axis of the pin 27. If the screw 32 slackened, however, then the carriage 12 can rotate to a limited extent about the vertical axis of the pin 27. Desirably, the locking plate 30 is provided with a tensioning device (not shown) which holds it to the mounting body 10 with a predetermined tension when the screw 32 is slackened. This predetermined tension should be enough to hold the pin 27 in the channel 28 firmly, but not so firmly as to restrict its rotation.

The direction of movement of the movable part 54 of the machine is indicated by an arrow 34 in FIG. 1. It will be seen that, relative to this movement, the pivotal joint allows the carriage 12 to pitch (i.e. pivot about the horizontal axis of the pin 18), under the bias of the spring 20. It also allows it to yaw (i.e. pivot about the vertical axis of the pin 27) when the screw 32 is slackened.

The end 24 of the carriage 12 has a castor wheel 36 mounted for rotation on a transverse horizontal axis. This wheel has a knife-edge bearing, so that it is free to wobble about the longitudinal axis of the carriage, as indicated by arrow 38. The wheel 36, in use, bears down on the tape 26 so as to adhere it to the fixed part 56 of the machine. It does so under the bias of the spring 20 as the carriage 12 pitches about the pin 18. It will be noted that this bias is not reliant on gravity, so the applicator can be used in any orientation, e.g. if the scale is to be fixed to a vertical surface or to the underside of the fixed part 50. The wobbling of the wheel 36 accommodates any roll error in the mounting of the body 10 to the movable part 54 of the machine, ensuring that the wheel 36 bears with even pressure across the width of the tape 26 even if the mounting of the body 10 is not quite vertical. Of course, it will be appreciated that this effect could be achieved in other ways instead of allowing the wheel 36 to wobble. For example, the pivotal joint between the carriage 12 and the body 10 could be given a third pivoting axis, making a true universal joint, so as to allow the carriage 12 to roll relative to the body 10 as well as to pitch and to yaw.

The method of use of the applicator to affix a tape scale 26 to the fixed part 50 of the machine will now be described.

The first step is to mount the applicator to the movable part 54 of the machine, in the place of the readhead, and prepare it for use. It may well be that the mounting to the machine will be subject to yaw errors which would interfere with the feeding of the tape through the applicator and result in a scale which is not accurately parallel to the guideway 52. To prepare the applicator, therefore, the movable part 54 is moved to the start of the guideway 52. The locking screw 32 is slackened so as to allow the carriage to yaw relative to the mounting body 10. The movable part 54 is then driven along the guideway 52 in the direction of the arrow 34 for a distance, sufficient for a castoring effect to take place whereby the carriage 12 is automatically lined up parallel to the guideway 52, free from yaw errors. This effect occurs because both the vertical pivot pin 27 and the trailing castor wheel 36 lie on the longitudinal axis of the carriage 12. Of course, while this is taking place the spring 20 is causing the carriage 12 to pitch about the horizontal pin 18 so that the wheel 36 is biased against the surface of the fixed part 50.

Once the carriage 12 is aligned parallel to the guideway 52 by this movement, the locking screw 32 is tightened to fix the carriage in this orientation relative to the mounting body 10 and the movable part 54. It will be noted that the locking screw 32 is on the body 10 not the carriage 12, so it is easy to do this without disturbing the orientation of the carriage 12.

Next, the movable part 54 of the machine (with the aligned applicator carriage 12) is returned to the start of the guideway 52. The tape scale 26 is now prepared and secured to the fixed part of the machine, as follows.

Figure 5:
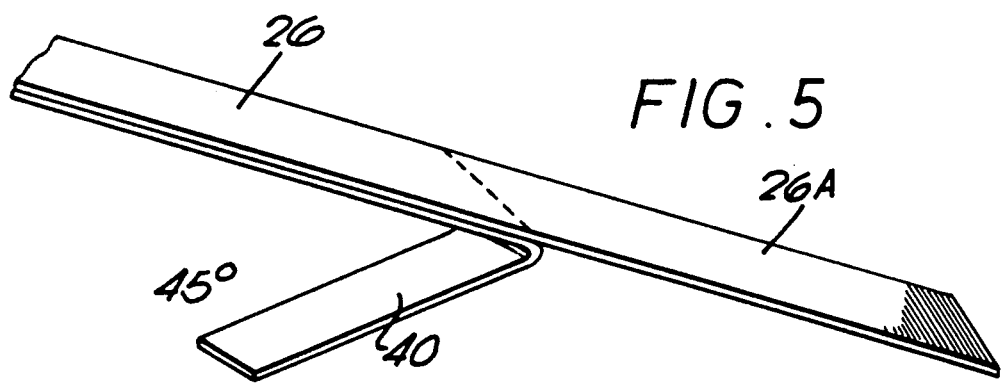
FIG. 5 shows part of a tape scale which is to be applied to the machine.
Figure 6:
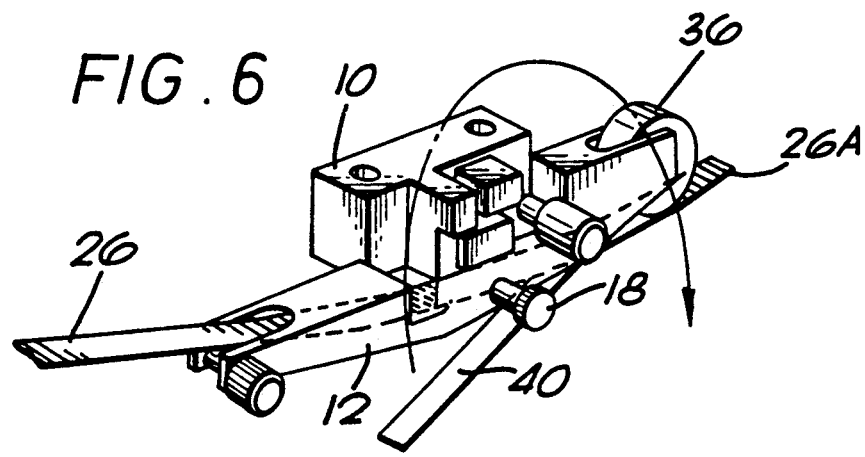
FIGS. 6 and 7 are isometric views showing the positioning of the scale in the device prior to applying it to the machine.
Figure 7:
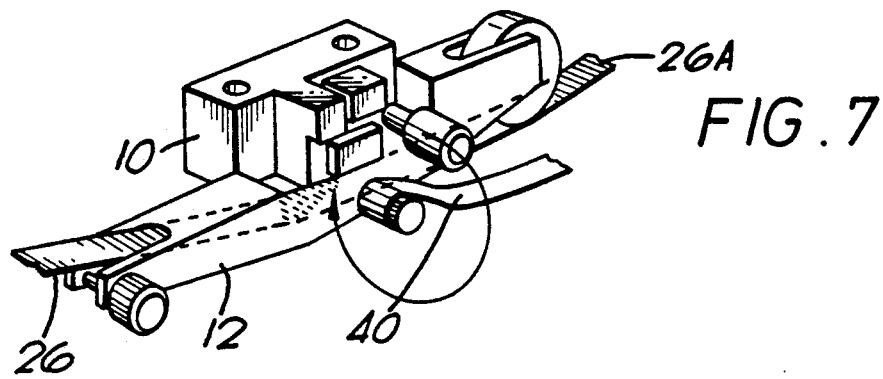
Figure 8:
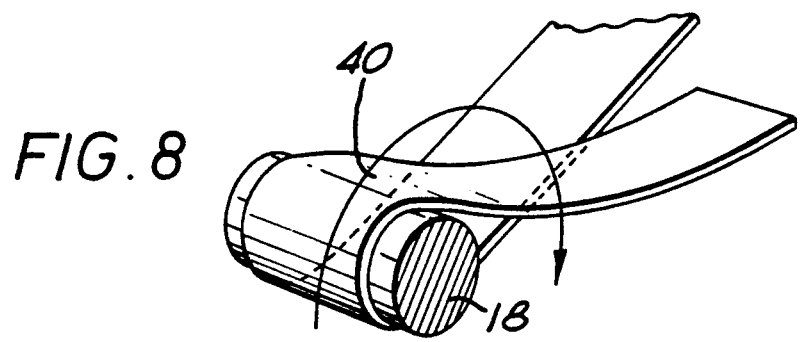
FIG. 8 is an enlarged view of part of FIG. 7.

First of all, the user cuts an appropriate length of the tape scale, complete with its self-adhesive layer and its backing strip. Then, as shown in FIG. 5, he prepares one end 26A of the tape by peeling back a short distance of the backing strip 40, folding it back upon itself at 45°. This prepared end 26A of the tape scale 26 is now fed through a guide channel 42 in an end 44 of the carriage 12 (opposite the wheel 36), the tape being fed over a guide pin 46, through the guide channel 42, and under the carriage 12 and the wheel 36, as shown in FIG. 6. (The guide pin 46 is removable to facilitate feeding in of the tape 26, and its subsequent removal). The exposed adhesive layer is used to adhere the end 26A to the fixed part 50 of the machine in this position, being pressed into place by the wheel 36 under the bias of the spring 20. The loose end of the backing strip 40 is then wrapped around the laterally projecting end of the pin 18 as shown in more detail in FIGS. 7 and 8, and is temporarily secured to the fixed part of the machine, e.g. with sticky tape. The remainder of the tape scale 26 is laid down along the fixed part 50 in approximately the desired position.

The machine is then operated to traverse the movable part 54 along the guideway 52. As this happens, the length of tape scale automatically feeds through the guide channel 42, and the backing strip 40 is peeled off and passes around the pin 18. The wheel 36 immediately presses the scale down into position on the fixed part 50, securing it by means of its self-adhesive layer. Because this action is caused by the travel of the movable part 54 along the machine guideway 52, it follows that the tape scale will automatically be laid exactly parallel to the guideway 52 as required. Moreover the feeding of the tape through the guide channel 42 and under the carriage 12 is likewise parallel to the guideway 52 because of the previous setting up of the carriage 12.

A preferred embodiment of the present invention will now be described with reference to FIGS. 9 to 12. In this embodiment a tape scale is applied to a substrate provided by a relatively fixed machine part 150. A relatively movable machine part 154 provides a mounting for a read head (not shown) and moves on a guideway 152.

Figure 10:
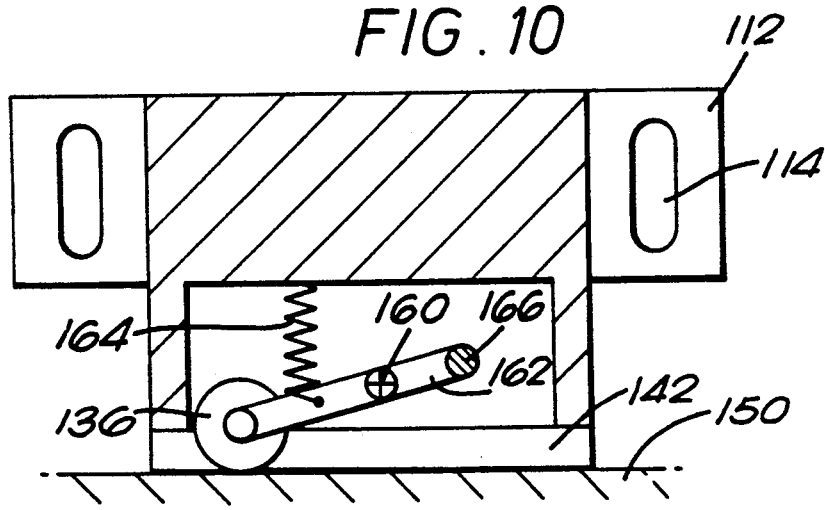
FIG. 10 is a section on the line X—X in FIG. 9.
Figure 11:
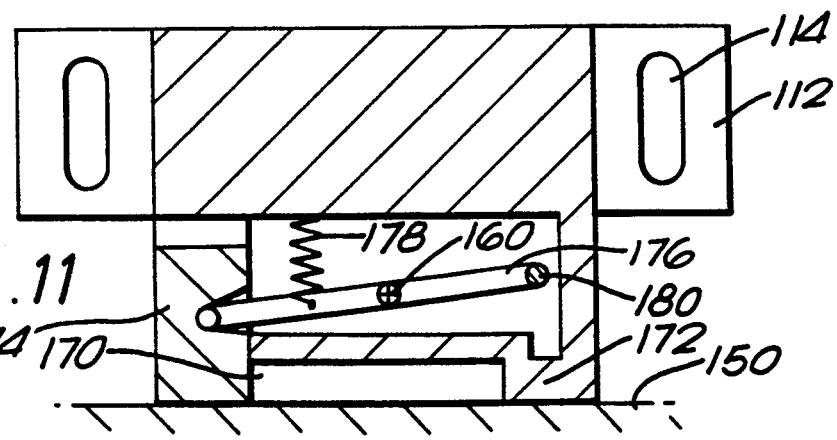
FIG. 11 is a section on the line XI—XI in FIG. 9.
Figure 9:
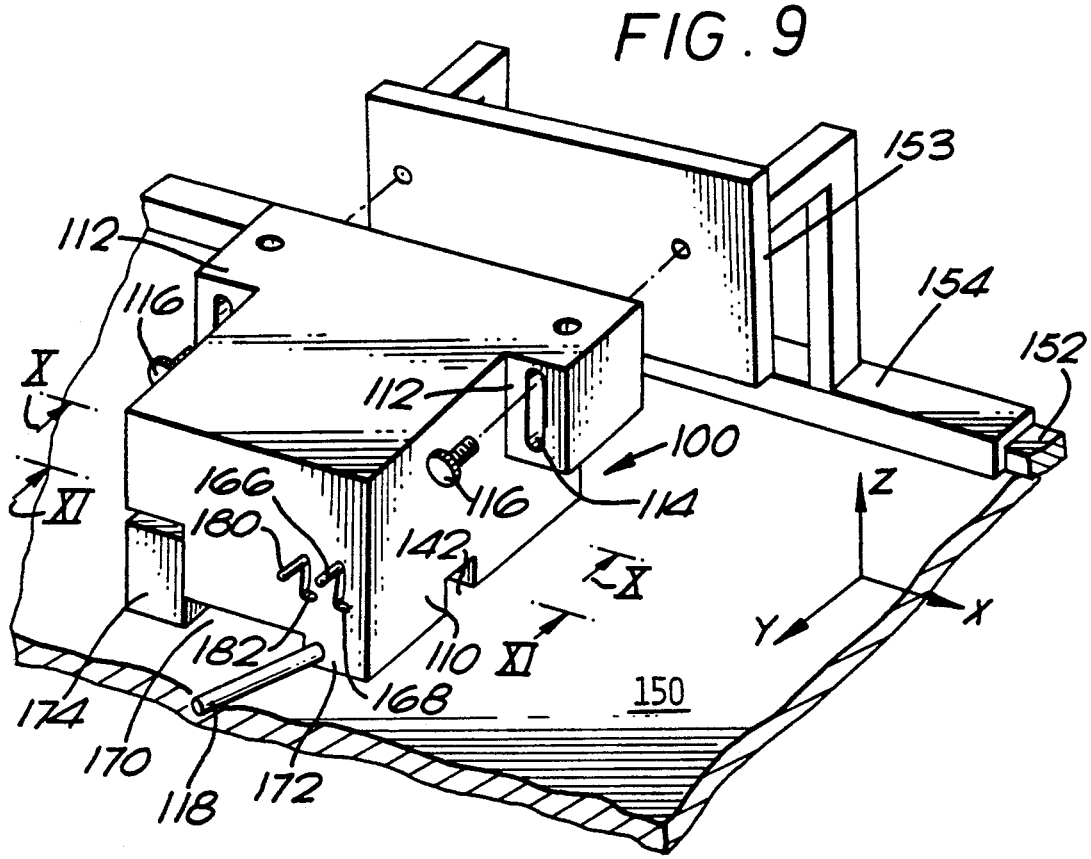
FIG. 9 is an isometric view of a second, and preferred, embodiment of a device according to the present invention.

Referring now to FIGS. 9 to 11, a tape scale applicator 100, comprises a mounting body 110 which has a form substantially identical to that of a read head. Specifically, the mounting body 110 has a substantially cubic form, and is provided with a pair of ear 112 having slots 114 which receive mounting screws 116 for connecting the mounting body 110 to a mounting bracket 153 for a read head provided on the relatively movable part 154. The applicator 100 has a guide channel 142 provided in the face of the mounting body adjacent the relatively fixed part 150, through which a scale passes when it is being applied to the relatively fixed part 150. The direction in which the guide channel 142 extends thus defines the x-axis. When the mounting body 110 is correctly aligned, the guide channel 142 extends parallel to the guideway 152 which supports the relatively movable part 154 (this ensures that the x-axis and the guideway will be parallel). A wheel 136 is provided inside the mounting body 110, and lies in the guide channel 142; the wheel 136 has its axis of rotation perpendicular to the direction of extension of the guide channel 142. The wheel 136 is attached to a bar 162 which pivots about a fulcrum 160, and a spring 164 biases the wheel 136 toward the relatively fixed part 150. A resilient lever 166 extends from the end of the arm 162 remote from the wheel 136, and provides a means for pivoting the wheel 136 about fulcrum 160 from outside of the mounting body 110. The lever 166 and an L shaped slot 168 (in which the free end of the lever is guided) provide a detent.

A second guiding channel 170 extends in the y direction, in the face of the mounting body 110 adjacent the relatively fixed part 150. The second guide channel 170 communicates between the guide channel 142 and the exterior of the mounting body 110.

A pair of lugs 172 and 174 are provided on either side of guide channel 170. The lug 174 is movable in the z direction by virtue of its connection to a bar 176 which pivots about fulcrum 160. The movable lug 174 is biassed toward the relatively fixed part 150 by a spring 178. A lever 180 connected to the bar 176 extends outside of the mounting body 110, and in an L shaped slot 182 to provide a detent.

A roller 118 extends from the mounting body, and adjacent the mouth of channel 170; its function is described later.

Figure 12:
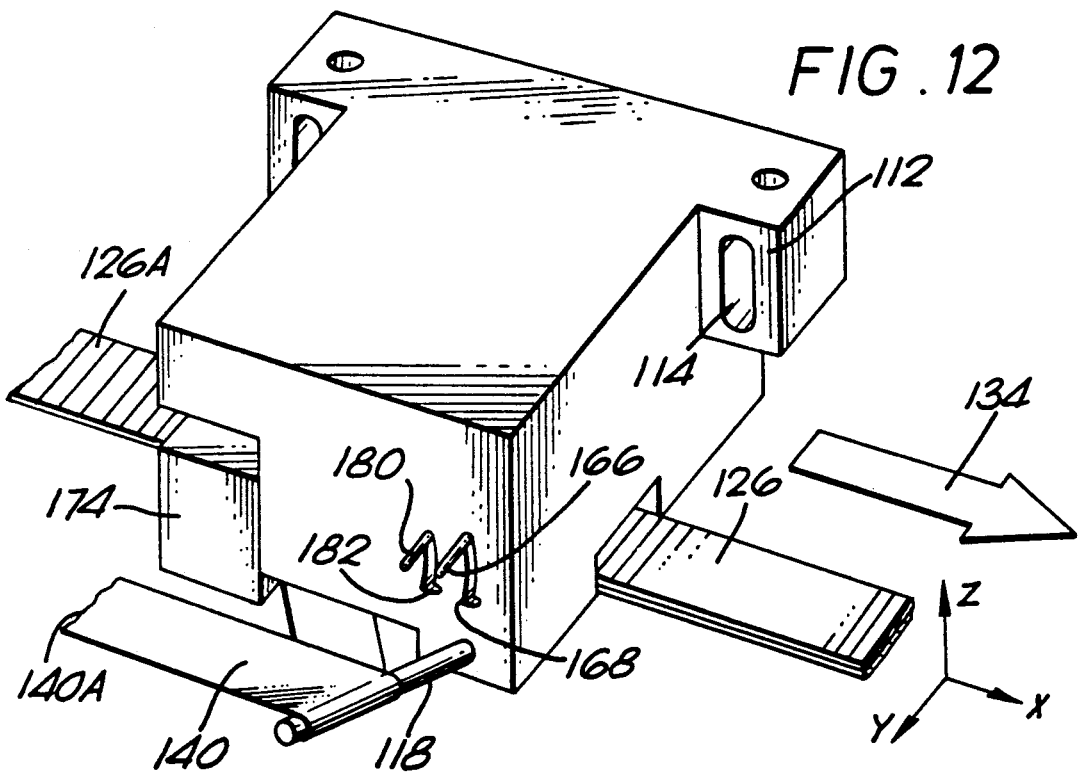
FIG. 12 is an isometric view showing the application of a scale to a substrate using the device of FIGS. 9 to 11.

The use of the mounting body 110 to affix a tape scale 126 to the substrate provided by relatively movable part 154 will now be described with reference to FIG. 12. The alignment of the mounting body 110 is adjusted until the guide channel 142 (effectively defining the x-direction) extends parallel to the guideway 152. Typically, a mechanism is provided on the relatively moveable part 154 to adjust the alignment of the mounting bracket 153 (and thus the alignment of the applicator 100) relative to the guideway 152. Alternatively, the alignment of the applicator may be adjusted relative to the mounting bracket 153 by spacers or washers.

The tape scale 126 is then passed through the guide channel 142. The end of the tape scale 126A adjacent movable lug 174 is removed from its backing strip 140, and movable lug 174 is raised by pressing lever 180. The backing strip is then pulled underneath the raised movable lug 174 until it rests in the second guide channel 170. The backing strip 140 is then passed around guide roller 118, and the free end 140A of backing strip 140 is taped to the surface of the relatively fixed part 150 so that the part of the backing strip 140 extending from the roller 118 to the free end 140A lies parallel to the scale 126. Movable lug 174 is then lowered toward the surface of the relatively fixed part 150, as is the wheel 136 (which as a result presses the scale 126 against the surface of the relatively fixed part 150). The entire mounting body 110 is then moved in the direction of arrow 134; the guide channel 142 thus automatically aligns the scale 126 relative to the relatively fixed part 150, the backing strip 140 is automatically removed, and the scale is affixed onto the relatively fixed part 150 by the action of the wheel 136 pressing on the scale 126.

It is possible, if desired, to provide a modified, more simple applicator based upon applicator 100. This simplified version simply has just a guiding channel. The backing strip of the tape scale is removed (manually) as the tape is fed into the guiding channel. The tape scale emerging from the guiding channel is then firmly affixed to the substrate by hand. This modified applicator has the advantage of being cheaper, but has the disadvantage that manual removal of the backing strip, and affixing of the scale, as the scale passes into and out of the channel respectively, are required.

If desired, the applicators described above can be fixed permanently or temporarily to the moveable part of the machine at a position other than the mounting for the read head. However, it is preferred to attach the applicator temporarily in place of the read head, as described, since this helps to ensure correct alignment of the scale with the read head.

We claim:

1. A method of applying a tape scale to a coordinate positioning machine, the machine having two members movable relative to each other along a first axis, one of the members providing a substrate for supporting the tape scale, and the other of the members providing a mounting for retaining a read head in register with the tape scale when supported by the substrate, the method comprising the steps of:
   mounting an applicator to said other member for aligning the scale relative to the substrate;
   passing the scale through the applicator and moving the two members relative to each other, thereby to align the scale along the extent of the relative movement; and
   affixing the aligned part of the scale to the substrate.

2. A method according to claim 1 wherein the applicator is mounted to said other member by attaching it to said mounting for retaining the read head.

3. A method according to claim 1 wherein the applicator has a guiding channel for aligning the scale, the method further comprising the step of aligning the guiding channel parallel to the first axis prior to passing the scale through the applicator.

4. A method according to claim 1, wherein the tape scale is self adhesive and is provided with a backing strip, the method further comprising the step of removing the backing strip from the scale prior to affixing the scale to the substrate.

5. A method according to claim 4 wherein the backing strip is removed after alignment of the scale.

6. An apparatus for applying a tape scale to a substrate on a coordinate positioning machine, the machine having a first member providing the substrate, and a second member having a mounting for retaining a read head in register with the substrate, the first and second members being relatively movable along an axis, the apparatus comprising,
   an applicator for aligning the scale on the substrate;
   means for mounting the applicator to the second member; and
   means for adjusting the alignment of the applicator relative to the second member.

7. An apparatus according to claim 6 wherein the applicator includes means for pressing the scale onto the substrate.

8. An apparatus according to claim 7 wherein the means for pressing the scale comprises a spring-biassed wheel.

9. An apparatus according to claim 6 wherein the applicator has means for automatically removing a backing strip from the tape scale.

10. An apparatus according to claim 6 having means for automatically removing the backing strip from the scale when the scale is aligned.

11. A method according to claim 2 wherein the applicator has a guiding channel for aligning the scale, the method further comprising the step of aligning the guiding channel parallel to the first axis prior to passing the scale through the applicator.

12. A method according to claim 2 wherein the tape scale is self adhesive and is provided with a backing strip, the method further comprising the step of removing the backing strip from the scale prior to affixing the scale to the substrate.

13. A method according to claim 3, wherein the tape scale is self adhesive and is provided with a backing strip, the method further comprising the step of removing the backing strip from the scale prior to affixing the scale to the substrate.

14. An apparatus according to claim 7, wherein the applicator has means for automatically removing a backup strip from the tape scale.

15. An apparatus according to claim 8, wherein the application has means for automatically removing a backup strip from the tape scale.

16. An apparatus according to claim 7, having means for automatically removing the backing strip from the scale when the scale is aligned.

17. An apparatus according to claim 8, having means for automatically removing the backing strip from the scale when the scale is aligned.

18. An apparatus according to claim 9, having means for automatically removing the backing strip from the scale when the scale is aligned.

* * * * *